3,012,003
STABILIZATION OF POLYOLEFINES WITH ALKALINE STABILIZERS

Frederick B. Speyer, Brea, Calif., assignor, by mesne assignments, to Collier Carbon and Chemical Corporation, a corporation of California
No Drawing. Filed Nov. 13, 1956, Ser. No. 621,538
10 Claims. (Cl. 260—45.7)

This invention relates to the treatment of polyolefines, and in particular concerns a method for treating solid polymers of olefinic hydrocarbons, particularly ethylene, to reduce their corrosivity with respect to ferrous metals at elevated temperatures.

According to the so-called "Ziegler process," polyolefines of high molecular weight are prepared by subjecting one or a mixture of olefinic hydrocarbons to the influence of a catalyst obtained by admixing an aluminum alkyl or aryl with a reducible compound of a metal of groups IV$b$ to VI$b$ of the periodic table. The polymerization occurs under relatively mild conditions of pressure and temperature, e.g., at 1–100 atmospheres and 50°–250° C. The aluminum alkyl or aryl component of the catalyst may be an aluminum trialkyl or triaryl, e.g., aluminum triethyl, aluminum tripropyl, aluminum tri-isobutyl, aluminum tri-octyl, aluminum tri-decyl, aluminum triphenyl, etc., or one of the alkyl or aryl groups may be replaced by halogen, alkoxy or aryloxy as in diethyl aluminum chloride, dimethyl aluminum methoxide, diphenyl aluminum bromide, diphenyl aluminum phenoxide, etc. Aluminum trialkyls and dialkyl aluminum halides are preferred. The heavy metal component of the catalyst is preferably titanium tetrachloride, but may be any reducible compound of titanium, zirconium, thorium, uranium, tantalum, chromium, vanadium, tungsten, etc. The exact nature of the catalyst is not known, but since the two components thereof react immediately upon admixture it seems clear that the catalyst itself constitutes some sort of a reaction product in which the heavy metal is present in a reduced state. The polymerization reaction is carried out in the presence of an inert liquid reaction medium which is preferably a hydrocarbon such as pentane, hexane, heptane, gas oil, diesel fuel, cyclohexane, benzene, xylene, etc. Conveniently, the organo-aluminum compound is dissolved in the reaction medium and the heavy metal compound is added gradually while dissipating the exothermic heat of reaction. In most cases, the reaction product is only slightly soluble in the reaction medium so that for the most part, the product so prepared comprises a dispersion of the catalytically active material in the liquid reaction medium. This product is then placed in a pressure vessel and the gaseous olefine is introduced into the vessel under the desired reaction pressure, e.g., 1–100 atmospheres. The vessel and contents are heated at the desired reaction temperature until the pressure within the vessel reaches a low fixed value. The crude polymerizate is then removed from the vessel and is treated with methanol or the like to "kill" or deactivate the catalyst. The solid polyolefine is then filtered off and is washed with methanol to remove the decomposed metal catalyst and thereby obtain a substantially ash-free odorless polyolefine product. For a more detailed description of the Ziegler process, reference is made to Belgian Patents Nos. 533,-362; 534,798; and 534,888.

To a large extent, the polyethylene and other polyolefines prepared by the Ziegler process find use in the manufacture of shaped articles, films, etc., by compression, injection, extrusion or vacuum molding, whereby the polymer granules are melted or softened by heat and forced under pressure into a heated mold or die. However, it has been the common experience of molders to find that at the elevated temperatures and pressures of the molding operation polyethylene and other polyolefines prepared by the Ziegler process are so highly corrosive to the mold or die that the latter is often ruined after relatively few cycles of use. To some extent the corrosiveness of Ziegler polymers can be obviated by very careful and very thorough washing of the same to remove an absolute maximum amount of the decomposed catalyst therefrom, but such operation is very time-consuming and requires large quantities of the wash solvent. Furthermore, it is often found that the molded polymer is characterized by an unpleasant odor.

It is accordingly an object of the present invention to provide a cheap and simple method for treating Ziegler process polyolefines to reduce their corrosivity with respect to ferrous metals at elevated temperatures and pressures.

Another object is to provide an improved process for the manufacture of polyolefines, particularly polyethylene.

A further object is to provide an improved process for molding Ziegler-process polyolefines.

A still further object is to provide a means for improving the odor of molded Ziegler-process polymers.

Other and related objects will be apparent from the following detailed description of the invention, and various advantages not specifically referred to herein will be apparent to those skilled in the art upon employment of the invention in practice.

I have now found that the above objects and attendant advantages may be realized by admixing with the polyolefine a small amount of a non-volatile alkali. More particularly, I have found that by washing normally corrosive Ziegler-process polyethylene or other polyolefine with a solution of an alkali and allowing a small amount of said alkali to be retained within the mass of polymer, the latter is rendered substantially non-corrosive with respect to ferrous metals at elevated temperatures and pressures. I am aware that it has been recommended that Ziegler polymers be washed with an alcoholic solution of an alkali in an effort to remove last traces of metal compounds therein. However, such recommended treatment in all cases included the further step of removing all of the alkali from the polymer by washing with pure alcohol or an aqueous solution of a surface-active agent; in no case has it been contemplated that beneficial results would accrue from allowing a small amount of the alkali to remain in or on the polymer.

The present invention thus consists essentially in the steps of treating a normally corrosive Ziegler-process polyolefine with a solution of a non-volatile alkali and thereafter drying the treated polymer without removal of such alkaline solution so as to obtain a polymer product having a small amount of the alkali absorbed thereon or therein. The invention is applicable to polymers prepared by subjecting a mono-olefine, e.g., ethylene, propylene, butylene, etc. to polymerizing conditions in the presence of a Ziegler catalyst. The term "Ziegler catalyst" is herein employed to designate a material capable of effecting the polymerization of low molecular weight mono-olefines to an average molecular weight above about 10,000 (or determined by viscosity measurements) at pressures below about 100 atmospheres and at temperatures of 50°–250° C. As previously stated, such catalysts are of unknown constitution, formed at ambient temperatures by reaction between organo-aluminum compounds and reducible compounds and reducible compounds of metals of groups IV$b$ to VI$b$ of the periodic table.

Considering now the process of the invention in detail, the non-volatile alkaline material which is incorporated into the polymer is preferably sodium hydroxide, although other alkali-metal hydroxides, e.g., potassium hydroxide, etc., and alkaline-earth metal oxides or hydroxides, e.g., calcium oxide, barium hydroxide, magnesium oxide, etc., may be employed to achieve the same object. Alkaline organic compounds, e.g., amines, quaternary ammonium bases such as tetramethyl ammonium hydroxide, etc., may also be employed provided they are sufficiently high-boiling to be retained in the solid polymer until the latter is molded. Suitably, the operable organic alkaline agents have boiling points above about 150° C. In the instances where the ultimate use of the molded polyolefine article requires that it be free of alkaline agents, the use of an organic alkali is particularly advantageous since the latter can be so selected with respect to its boiling point that it remains in the polymer at ordinary storage temperatures but is vaporized out of the same during the molding operation. Organic alkaline agents boiling between about 200° C. and about 250° C., are suitable for such purpose.

As previously stated, the alkaline material is preferably incorporated into the solid polymer with the aid of a liquid vehicle, i.e., in the form of a dispersion (which term is herein employed to designate true solutions, colloidal solutions and true dispersions) in a liquid suspending medium which is a non-solvent for the polymer itself. As is shown hereinafter, I have found that more consistent and satisfactory results are attained when the alkaline material is employed in conjunction with a liquid vehicle than when it is mechanically admixed with the polymer. Since the polyolefines are somewhat hydrophobic, it is preferred that the liquid vehicle be of an organic nature, e.g., an alcohol, ketone or hydrocarbon, although aqueous liquids may be employed satisfactorily if the polymer is relatively finely divided or if they are employed in conjunction with a wetting agent. The preferred composition is a solution of sodium hydroxide in methanol. The concentration of the alkaline material in the liquid vehicle may be varied between wide limits, e.g., from as little as 0.01 percent by weight to 20 percent by weight or even higher. However, it is easier to control the amount of alkaline material retained by the polymer by employing a relatively large quantity of a dilute treating composition, rather than by employing a small quantity of a concentrated composition. Thus, for example, it is better practice to treat the solid polymer with, say, 10 volumes of a 0.5 percent solution of sodium hydroxide in methanol than with, say, ½ volume of a 10 percent solution. Preferably, the treating composition contains the alkaline agent in 0.01–2 percent by weight concentration.

The treating operation itself consists simply in admixing the solid polymer (usually in granular form) with the treating composition, and thereafter filtering off the latter and drying the polymer without washing. It is in the latter step that the present process differs from the prior art practice referred to above. Heretofore it was thought that alkali treatment of the solid polymer would neutralize all of corrosion-inducing impurities contained therein, and after the alkali treatment the polymer was carefully washed to remove the neutralized impurities and excess alkali. If tested more or less immediately after such treatment, the treated polymer shows a reduced tendency to corrode ferrous metals at elevated temperatures; however, the results so obtained are neither consistent nor permanent. The present invention is based on the concept of allowing a relatively small amount of alkali to remain in the polymer, i.e. on the concept of providing the polymer with what might be termed an "alkaline reserve" which will be present at the time when the polymer is contacted with a ferrous metal at an elevated temperature during the molding operation. Presumably, the small amount of alkali which is allowed to remain with the polymer in accordance with the invention serves to neutralize corrosion-inducing entities which are formed in the polymer either during storage or during the molding operation; however, such postulation is not to be considered as limiting the invention in any way.

The amount of alkaline material which is left on the solid polyolefine should of course be sufficient to effect a substantial reduction in corrosion of ferrous metals by the polymer at elevated temperatures. Numerically, such amount will depend upon the nature and purity of the polymer, the identity of the alkaline material, and upon the conditions under which corrosion may be encountered, e.g., the molding temperature and pressure. Ordinarily, however, the alkali treatment is controlled so that the dried treated polymer will contain between about 0.01 and about 0.5 percent by weight of the alkaline material. Control of the amount of alkaline material left in the polymer may be effected in various ways. Preferably, the volume of treating composition employed and the concentration of alkaline material therein are so selected that upon completion of the filtration step the desired amount of alkaline material is retained by the polymer. Under ordinary circumstances this can be accomplished by admixing the polymer with from about 1 to about 5 volumes of a 0.01 to 0.5 percent by weight solution of sodium hydroxide in methanol, and thereafter filtering off the excess sodium hydroxide solution to obtain a polyolefine product having a film of the sodium hydroxide solution adhering to the particles thereof. Such product is then dried, e.g., in a vacuum oven at 100° C., to remove the solvent and leave the sodium hydroxide intimately associated with the polymer. To some extent, the amount of alkaline material left with the polymer can be controlled by varying the filtration conditions, e.g., filtering with the aid of vacuum, etc. A somewhat less desirable, but nonetheless operable, means for controlling the amount of alkaline material left with the polymer consists in admixing the polymer with a relatively concentrated treating composition, filtering off excess composition, and thereafter washing the treated polymer with a solvent for the alkaline material until the amount of the latter remaining with the polymer is reduced to the desired value.

Separation of the excess treating composition from the treated polymer has been described above as being accomplished by filtration, either with or without the aid of vacuum. However, as will be apparent to those skilled in the art, other methods for separating solids from liquids, e.g., centrifuging, may be employed with equal success. The essential requirement is only that the separation treatment be of such nature or be carried out in such manner that there remains with the separated polymer sufficient of the treating composition to provide the required amount of alkaline material in the dried polymer. Similarly, the drying operation may take any form and may make use of any of the various types of equipment, e.g., tray driers, drum driers, etc. Again, it is necessary only that operation be of such nature as to allow the desired quantity of alkaline material to remain with the dried polymer.

In molding or otherwise shaping polyolefines which have been treated as explained above, entirely conventional techniques are employed, and any of the various means for fabricating thermoplastic materials, e.g., compression molding, injection molding, extrusion, etc. may be applied. Insofar as temperature, pressure, and general handling techniques are concerned, polyolefines which have been treated as above described are substantially equivalent to untreated polymers; it is only with respect to greatly reduced corrosivity that any substantial difference appears.

In determining the corrosivity of polyolefines, the following test procedure has been followed: A die-steel base plate, 4" x 5" x ⅛", is polished to a smooth shiny surface with grade 150 and grade 240 emery cloth (Metalite, manufactured by Norton Abrasives Company). A stainless steel shim, 4" x 5" x 0.02", having four symmetrically spaced 1½" circular cutouts is superimposed on the base plate, and is sealed thereto with high pressure silicone grease. Samples of the test polymer in finely-divided form are placed within the shim cutouts, the polymer being employed in such amount that after molding there is formed within each cutout a fused polyolefine disc, 1½" in diameter and 0.02" thick. A stainless steel top plate, 4" x 5" x 0.05" is then superimposed on the shim and is lubricated with high-pressure silicone grease. The mold assembly so prepared is placed in a hydraulic press, the platens of which have been preheated to 250° C., and a pressure of 20,000 p.s.i.g. is applied and maintained for 5 minutes. While still maintaining said pressure, the heating medium is cut off and cold water is circulated through the platens until they cool to 40°–60° C. The pressure is then released, the mold is dissembled, and the base plate is allowed to stand at room temperature for about 30 minutes, after which it is carefully rubbed with a cloth saturated with xylene to remove any adhering particles of plastic. After about 1 hour the base plate is examined visually for evidence of corrosion and is rated on a scale of 0–10 in which the polished steel is rated at 0 and a completely corroded plate (dark reddish-black color) is rated at 10.

The following table presents data obtained by subjecting variously treated samples of polyethylene to the above-described test procedure. In all cases the polyethylene employed had been prepared by polymerizing ethylene at relatively low pressures and temperatures in the presence of an aluminum alkyl catalyst.

spect to ferrous metals at elevated temperatures and pressures of a high-molecular weight solid polymer selected from the class consisting of polyethylene and polypropylene, said polymer having been prepared by subjecting the corresponding monomer to polymerizing conditions in the presence of a polymerization catalyst obtained by admixing an organo-aluminum compound selected from the class consisting of aluminum trialkyls and dialkyl aluminum halides with a reducible compound of a metal of Groups IV$b$ to VI$b$ of the periodic table, and said polymer containing normally incident impurities which render it corrosive with respect to ferrous metals at molding temperatures and pressures, which process consists in admixing said solid polymer with a dispersion of an alkaline material in a liquid vehicle which is a non-solvent for said solid polymer, said alkaline material being selected from the class consisting of alkali metal hydroxides, alkaline earth metal oxides and organic alkalies boiling above 150° C., thereafter removing said liquid vehicle from said solid polymer and depositing a sufficient amount of said alkaline material on said solid polymer to reduce substantially the corrosivity of said polymer when the mixture of solid polymer and alkaline material is subjected to molding temperatures and pressures.

| Test No. | Treatment | Gms. Polymer Treated | Treating Composition | Amount of Treating Composition Employed | Amount of Alkaline Material Retained in Polymer | Corrosion Rating |
|---|---|---|---|---|---|---|
| 1 | | | | | | 10 |
| 2 | (¹) | 500 | 0.5% NaOH in Methanol | 600 | | 2 |
| 3 | (¹) | 500 | 0.3% NaOH in Methanol | 1,000 | 0.15 | 2 |
| 4 | (²) | 100 | 1% NaOH in Methanol | 200 | 0.25 | 2 |
| 5 | (¹) | 50 | 0.2% NaOH in Methanol | 100 | 0.08 | 1 |
| 6 | (¹) | 50 | 0.25% NaOH in Methanol | 100 | 0.10 | 1 |
| 7 | (¹) | 30 | 0.015% NaOH in Methanol | 200 | 0.02 | 3 |
| 8 | (¹) | 30 | 0.04% NaOH in Methanol | 250 | 0.10 | 1 |
| 8a ³ | (¹) | 30 | 0.04% NaOH in Methanol | 250 | 0.10 | 0.5 |
| 10 | (²) | 10 | 2 parts NaNO₃+1 part NaOH | 0.15 | 1.5 | 2 |
| 11 | (²) | 10 | 1.5 parts NaNO₃+1 part NaOH | 0.25 | 2.5 | 2 |

¹ Test polymer was mixed with stated amount of stated treating composition at room temperature; mixture filtered under laboratory vacuum; polymer dried at 100° C. under 20 in. vacuum for 4–16 hours.
² Test polymer and stated amount of solid alkaline material were ground together using a mortar and pestle.
³ Treated polymer aged 1 month before testing.

Similar results were obtained when polypropylene, prepared at relatively low temperatures and pressures with a Ziegler catalyst, was similarly treated with solution of sodium hydroxide in methanol.

In addition to reducing the corrosivity of Ziegler process polyolefines, the present treating process effects a very material improvement in the general characteristics of compression molded film. The following table presents a comparison of such characteristics of 0.02" film molded from treated and untreated polyethylene:

| Characteristic | Untreated Polyethylene | Polyethylene Containing 0.2% NaOH |
|---|---|---|
| Bubbles in film | many | very few. |
| Warpage | poor | good. |
| Clarity | poor | good. |
| Color | poor | good. |
| General Appearance | poor | good. |
| Color after 672 hours' exposure to ultraviolet | very slight yellowing. | very slight graying. |

Other modes of applying the principle of my invention may be employed instead of those explained, change being made as regards the materials or methods employed, provided the step or steps stated by any of the following claims, or the equivalent of such stated step or steps be employed.

I, therefore, particularly point out and distinctly claim as my invention:

1. The process for reducing the corrosivity with respect to ferrous metals at elevated temperatures and pressures of a high-molecular weight solid polymer selected from the class consisting of polyethylene and polypropylene, said polymer having been prepared by subjecting the corresponding monomer to polymerizing conditions in the presence of a polymerization catalyst obtained by admixing an organo-aluminum compound selected from the class consisting of aluminum trialkyls and dialkyl aluminum halides with a reducible compound of a metal of Groups IV$b$ to VI$b$ of the periodic table, and said polymer containing normally incident impurities which render it corrosive with respect to ferrous metals at molding temperatures and pressures, which process consists in admixing said solid polymer with a dispersion of an alkaline material in a liquid vehicle which is a non-solvent for said solid polymer, said alkaline material being selected from the class consisting of alkali metal hydroxides, alkaline earth metal oxides and organic alkalies boiling above 150° C., thereafter removing said liquid vehicle from said solid polymer and depositing a sufficient amount of said alkaline material on said solid polymer to reduce substantially the corrosivity of said polymer when the mixture of solid polymer and alkaline material is subjected to molding temperatures and pressures.

2. A process as defined by claim 1 wherein said polymer is polyethylene.

3. A process as defined by claim 1 wherein said polymer is polypropylene.

4. A process as defined by claim 1 wherein said alkaline material is employed in an amount representing between about 0.01 and about 0.5 percent by weight of the mixture of solid polymer and alkaline material.

5. A process as defined by claim 1 wherein said reducible metal compound is titanium tetrachloride.

6. The method of making molded articles from a high molecular weight solid polymer selected from the class consisting of polyethylene and polypropylene, said polymer having been prepared by subjecting the corresponding monomer to polymerizing conditions in the presence of a polymerization catalyst obtained by admixing an organo-aluminum compound selected from the class consisting of aluminum trialkyls and dialkyl aluminum halide with a reducible compound of a metal of groups IV$b$ to VI$b$ of the periodic table, and said polymer containing normally incident impurities which render it corrosive with respect to ferrous metals at molding temperatures and pressures, which process consists in admixing with said solid polymer a dispersion of an alkaline material in a liquid vehicle which is a non-solvent for said polymer, said alkaline material being selected from the class consisting of alkali metal hydroxides, alkaline earth oxides and organic alkalies boiling above 150° C., removing said liquid vehicle from said solid polymer and depositing a sufficient amount of said alkaline material on said polymer to reduce substantially the normal corrosivity of said polymer, and thereafter molding the resulting polymer by heating it to a softening temperature and forcing it under pressure into intimate contact with a ferrous metal die.

7. A method as defined by claim 6 wherein said polymer is polyethylene.

8. A method as defined by claim 6 wherein said polymer is polypropylene.

9. A method as defined by claim 6 wherein said alkaline material is sodium hydroxide and said liquid vehicle is methanol.

10. A method as defined by claim 6 wherein said dispersion is a methanol solution of sodium hydroxide of between about 0.01 and about 2 percent concentration, and is employed in such amount that after removal of the methanol the resulting mixture of solid polymer and sodium hydroxide contains between about 0.01 and about 0.5 percent by weight of sodium hydroxide.

References Cited in the file of this patent

UNITED STATES PATENTS

| | | |
|---|---|---|
| 2,387,571 | Fikentscher et al. | Oct. 23, 1945 |
| 2,555,221 | Burroughs | May 29, 1951 |
| 2,734,892 | Carter | Feb. 14, 1956 |
| 2,834,768 | Friedlander | May 13, 1958 |
| 2,838,477 | Roelen et al. | June 10, 1958 |
| 2,845,412 | Heyson | July 29, 1958 |